(12) United States Patent
Iwashita et al.

(10) Patent No.: US 6,254,771 B1
(45) Date of Patent: Jul. 3, 2001

(54) METHOD OF PROCESSING DESULFURIZATION ABSORPTION LIQUID AND APPARATUS THEREFOR

(75) Inventors: Koichiro Iwashita; Takeo Shinoda, both of Tokyo; Masakazu Onizuka, Hiroshima; Masao Hino, Hiroshima; Kenji Inoue, Hiroshima, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/355,799

(22) PCT Filed: Jan. 28, 1998

(86) PCT No.: PCT/JP98/00332

§ 371 Date: Aug. 4, 1999

§ 102(e) Date: Aug. 4, 1999

(87) PCT Pub. No.: WO98/34716

PCT Pub. Date: Aug. 13, 1998

(30) Foreign Application Priority Data

Feb. 5, 1997 (JP) .................................................... 9-037170
Dec. 16, 1997 (JP) .................................................... 9-346024

(51) Int. Cl.[7] ................. C02F 1/24; B03D 1/14; C01B 31/02
(52) U.S. Cl. .................. 210/209; 210/221.2; 209/168; 209/170; 423/461
(58) Field of Search ................. 210/767, 776, 210/201, 202, 220, 221.1, 221.2, 209, 219; 95/195, 205; 423/445, 461; 209/163–165, 168, 170

(56) References Cited

U.S. PATENT DOCUMENTS 3,147,093 * 9/1964 Dille et al. .
3,616,919 * 11/1971 Feddern et al. .
3,864,251 * 2/1975 Cymbalisty .
4,156,712 * 5/1979 Kanai et al. .
4,186,087 * 1/1980 Kato .
4,203,954 * 5/1980 Asanagi .
4,207,185   6/1980 Hinds .................................. 210/703
4,643,852 * 2/1987 Koslow .
4,997,549 * 3/1991 Atwood .
5,080,780 * 1/1992 Canzoneri et al. .
5,352,421 * 10/1994 Smith et al. .
5,456,363 * 10/1995 Groppo et al. .
5,660,616 * 8/1997 Choi et al. .

FOREIGN PATENT DOCUMENTS

| 53-112295 | 9/1978 | (JP) . |
| 62-40064 B2 | 8/1987 | (JP) . |
| 06115933 | 4/1994 | (JP) . |
| 06171934 | 6/1994 | (JP) . |
| 06219735 | 8/1994 | (JP) . |
| 06256014 | 9/1994 | (JP) . |
| 06256015 | 9/1994 | (JP) . |

* cited by examiner

Primary Examiner—David A. Simmons
Assistant Examiner—Fred Prince
(74) Attorney, Agent, or Firm—Myers Bigel Sibley & Sajovec, P.A.

(57) ABSTRACT

This invention relates to a method for the treatment of a desulfurization absorbing fluid after gas-liquid contact with combustion exhaust gas in which fine particles of unburned carbon and other materials are efficiently removed from the desulfurization absorbing fluid to improve the quality of a by-product (e.g., gypsum) obtained therefrom. The method of this invention comprises the steps of feeding a gas into a desulfurization absorbing fluid (A) containing fine particles of unburned carbon and other materials and thereby producing gas bubbles so as to cause the fine particles to adhere to the surfaces of the gas bubbles and create a foam phase (D) consisting of the gas bubbles; and breaking the foam phase (D) to obtain a liquid (E) containing the fine particles.

4 Claims, 9 Drawing Sheets

METHOD OF PROCESSING DESULFURIZATION ABSORPTION LIQUID AND APPARATUS THEREFOR

BACKGROUND OF THE INVENTION

1. Field of the Invention

This invention relates to a technique for separating and removing fine particles of unburned carbon and other materials present in a desulfurization absorbing fluid after gas-liquid contact in a wet flue gas desulfurizer for removing sulfur oxides from the combustion exhaust gas of a boiler or the like.

2. Description of the Related Art

In a wet flue gas desulfurizer, exhaust gas is cleaned by gas-liquid contact with an absorbing fluid containing lime or the like, so that sulfur oxides ($SO_x$) and fine particles of unburned carbon and other materials are removed therefrom. The fine particles of unburned carbon and other materials which have passed from the exhaust gas to the absorbing fluid remain in the by-product (e.g., gypsum) separated and recovered from the absorbing fluid and cause a reduction in purity and a reduction in quality due to discoloration.

Conventionally, in order to reduce the content of impurities (i.e., fine particles of unburned carbon and other materials) in gypsum obtained as a by-product to less than a specified level, it has been common practice to concentrate the gypsum present in the absorbing fluid having sulfur oxides ($SO_x$) absorbed therein by means of a liquid cyclone and thereby reduce the content of unburned carbon on a relative basis. However, since unburned carbon behaves in substantially the same manner as the absorbing fluid, there is a limit in reducing the content of unburned carbon by concentrating the gypsum by means of a liquid cyclone. For example, even if the requirements for the purity of gypsum are met, a reduction in quality due to a deterioration of appearance by discoloration may be unavoidable.

Thus, gypsum obtained as a by-product in wet flue gas desulfurization involves problems such as reduced prices and limited uses due to discoloration caused by impurities comprising fine particles of unburned carbon and other materials.

An object of the present invention is to provide a method and apparatus for the treatment of a desulfurization absorbing fluid which enables fine particles of unburned carbon and other materials to be efficiently removed from the desulfurization absorbing fluid prior to the separation of a by-product so that a by-product (e.g., gypsum) having a low impurity content and showing little discoloration may be separated and recovered from the desulfurization absorbing fluid.

SUMMARY OF THE INVENTION

According to the present invention, there Is provided a method for the treatment of a desulfurization absorbing fluid after gas-liquid contact with combustion exhaust gas containing fine particles of unburned carbon and other materials, which comprises the steps of feeding a gas into the absorbing fluid containing the fine particles and thereby producing gas bubbles so as to cause the fine particles to adhere to the surfaces of the gas bubbles and create a foam phase consisting of the gas bubbles; and breaking the foam phase to obtain a liquid containing the fine particles. Preferably, the gas is fed into the absorbing fluid at a flow rate of 50 to 300 $m^3N/h \cdot m^2$ per unit cross-sectional area of the absorbing fluid.

According to the present invention, there is also provided an apparatus for the treatment of a desulfurization absorbing fluid after gas-liquid contact with combustion exhaust gas containing fine particles of unburned carbon and other materials, which comprises a treating tank for storing the absorbing fluid containing the fine particles, the treating tank having an absorbing fluid feed port for feeding the absorbing fluid into the treating tank, and a gas feed port for feeding a gas into the absorbing fluid stored in the treating tank and thereby producing gas bubbles to create a foam phase consisting of the gas bubbles in the treating tank; a foam breaking tank adjoining the treating tank; a foam inlet pipe for connecting the treating tank with the foam breaking tank in fluid communication relationship; and foam breaker means disposed in the foam breaking tank for breaking the foam phase having passed through the foam inlet pipe to obtain a liquid containing the fine particles.

A plurality of apparatus for the treatment of a desulfurization absorbing fluid as described above may be installed in successive stages, and these apparatus may be connected by feeding means for delivering the fine particle-containing liquid obtained in the apparatus at the preceding stage to the absorbing fluid feed port of the apparatus at the succeeding stage.

In the aforesaid apparatus for the treatment of a desulfurization absorbing fluid, the treating tank may have an outlet port for withdrawing the absorbing fluid stored in the treating tank, and the aforesaid apparatus may be equipped with means for returning a portion of the absorbing fluid withdrawn from the outlet port, together with the gas, to the treating tank through the gas feed port.

A plurality of apparatus for the treatment of a desulfurization absorbing fluid as described above may be installed in successive stages, and these apparatus may be connected by feeding means for delivering the absorbing fluid withdrawn from the outlet port of the treating tank of the apparatus at the preceding stage, except the portion returned to the treating tank, to the absorbing fluid feed port of the apparatus at the succeeding stage.

According to the method of the present invention, fine particles of unburned carbon and other materials are efficiently removed from a desulfurization absorbing fluid containing such fine particles as a result of gas-liquid contact with combustion exhaust gas, so that the by-product (e.g., gypsum) obtained by solid-liquid separation of the desulfurization absorbing fluid has high purity and shows little discoloration.

Moreover, when the treating apparatus of the present invention is employed, highly pure gypsum having high whiteness can be recovered even if the electrostatic precipitator is omitted.

DETAILED DESCRIPTION OF THE PREFERRED EMBODIMENTS

Combustion exhaust gas produced from coal-fired boilers, oil-fired boilers and the like contains about 100 to 1,000 ppm of sulfur oxides ($SO_x$). In order to remove sulfur oxides from such combustion exhaust gas, this combustion exhaust gas is brought into gas-liquid contact with an absorbing fluid by means of a wet flue gas desulfurizer. The sulfur oxides react with the absorbing fluid, if necessary, under oxidizing conditions created by contact with air, so that a by-product such as gypsum is formed. This by-product is recovered by solid-liquid separation or the like.

As the absorbing fluid, there may be used a lime slurry (i.e., a slurry of calcium carbonate, calcium hydroxide or calcium oxide), a slurry of magnesium hydroxide, an aqueous solution of sodium hydroxide, an aqueous solution of sodium sulfite, an aqueous solution of basic aluminum sulfate, dilute sulfuric acid, aqueous ammonia or the like.

The by-products obtained according to the type of the absorbing fluid include gypsum (calcium sulfate), sodium sulfate, magnesium sulfite, magnesium sulfate, ammonium sulfate and the like.

By way of example, a wet desulfurization process using a lime slurry is explained. First of all, combustion exhaust gas from a fuel oil-fired boiler is brought into gas-liquid contact with an absorbing fluid comprising a lime slurry having a concentration of 10 to 30% by weight. Sulfur oxides react with the absorbing fluid and are further oxidized with air to form gypsum. This gypsum precipitates from the absorbing fluid to yield a slurry having a gypsum concentration of 10 to 30% by weight. In addition to gypsum, this slurry (or desulfurization absorbing fluid) contains black unburned carbon in an amount of several hundred to several thousand milligrams per liter, and soluble salts having high solubility, such as ammonium sulfate. Now, an apparatus for removing this unburned carbon and the like from the desulfurization absorbing fluid is specifically described hereinbelow.

Figure 1:
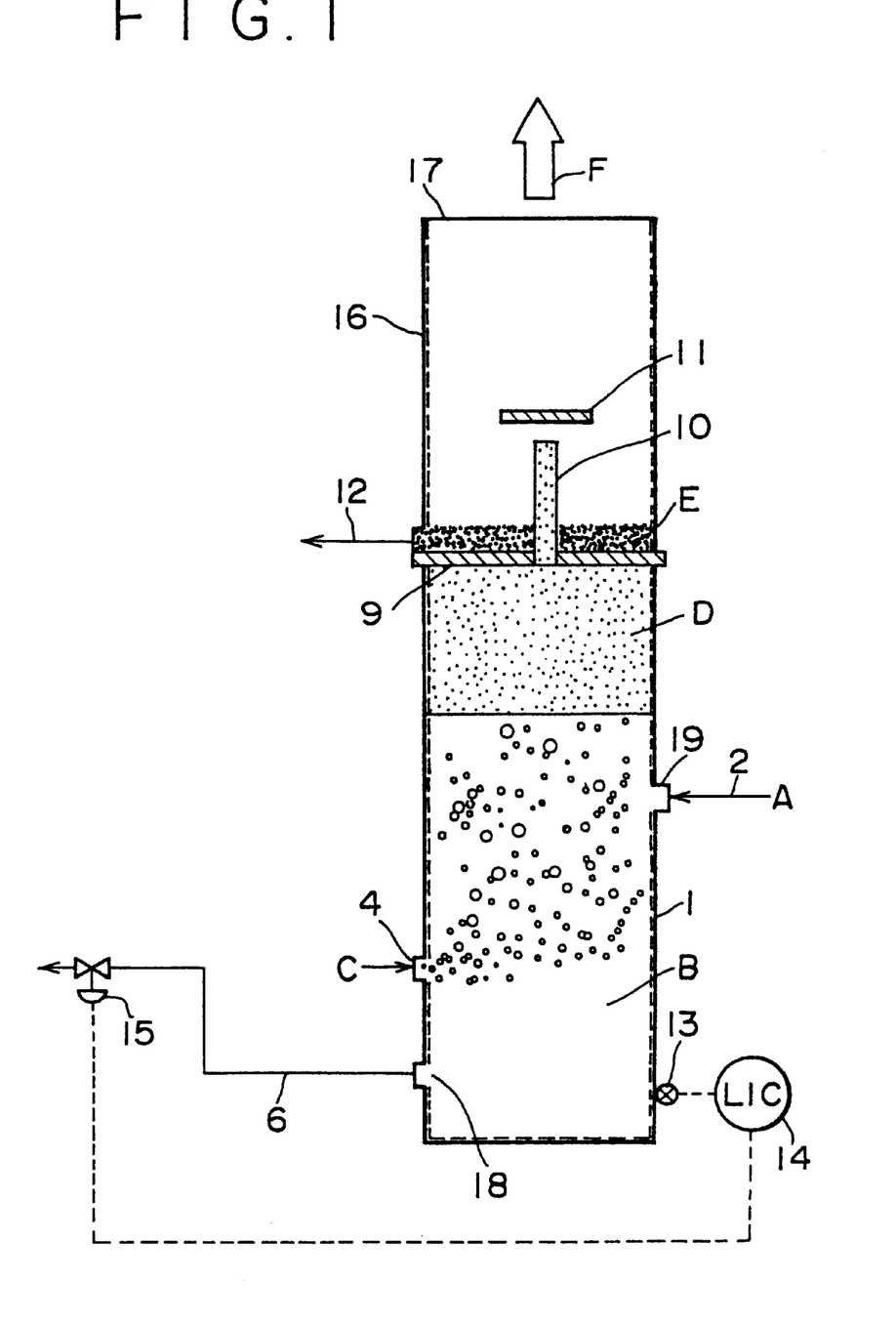
FIG. 1 is a schematic view illustrating an apparatus for the treatment of a desulfurization absorbing fluid in accordance with one embodiment of the present invention.

FIG. 1 illustrates an apparatus for the treatment of the desulfurization absorbing fluid in accordance with the present invention. In FIG. 1, the desulfurization absorbing fluid A conducted through a feed pipe 2 and fed Into a treating tank 1 through an absorbing fluid feed port 19 Is stored in treating tank 1 as stored fluid B. The position of the surface of stored fluid B within treating tank 1 is regulated by controlling the flow rate of the desulfurization absorbing fluid flowing through a withdrawal pipe 6 by means of a regulating valve 15 controlled by a controller 14 in response to the value detected with a level detector 13. In this case, the amount of absorbing fluid discharged through withdrawal pipe 6 is preferably regulated in response to the amount of sulfur oxides removed in the wet desulfurizer.

On the other hand, a gas C is fed into treating tank 1 through a gas feed port 4 formed at a position lower than that of feed pipe 2. As gas C, there may be used air, nitrogen gas or the like. In stored fluid B, gas C produces gas bubbles which move upward. In the course of the movement of gas bubbles through stored fluid B, fine particles of unburned carbon and other materials in stored fluid B gather around the gas bubbles to stabilize them, and move upward together with the gas bubbles. Thus, a foam phase D consisting of the gas bubbles is formed in the space of treating tank 1 above the surface of stored fluid B.

Foam phase D containing fine particles of unburned carbon and other materials passes through foam inlet pipe 10, flows into a foam breaking tank 16 separated by a separator 9, and is broken by foam breaker means 11 comprising a foam breaker plate or the like. Thus, foam phase D is separated into a liquid (or broken foam liquid) E containing fine particles of unburned carbon and other materials, and an off-gas F. Broken foam liquid E is accumulated in the bottom of foam breaking tank 16 and then discharged from the system through an overflow pipe 12. On the other hand, off-gas F produced as a result of foam breaking is discharged from a gas outlet 17 provided at the top of foam breaking tank 16. This off-gas F may be used as gas C to be fed into treating tank 1.

In FIG. 1, foam breaking tank 16 is installed above treating tank 1. However, since what is required is to remove foam phase D from treating tank 1 and breaks it before foam phase D reaches its free height and breaks spontaneously, foam breaking tank 16 may be installed so as to be adjacent to the sidewall of treating tank 1.

In FIG. 1, treating tank 1 has only one gas feed port 4, but may have a plurality of gas feed ports.

In FIG. 1, gas feed port 4 is positioned above absorbing fluid outlet port 18. This is advantageous in that gas bubbles are not sucked into absorbing fluid outlet port 18. However, so long as no such difficulty arises, gas feed port 4 may be formed below absorbing fluid outlet port 18 or at the bottom of treating tank 1.

Besides a foam breaker plate, useful examples of the foam breaker means include an impeller, a stream of water, a stream of gas, heat, sprinkling of an antifoaming agent, ultrasonic irradiation, and an electric discharge.

Where foam breaker means 11 comprises a foam breaker plate, the diameter of foam inlet pipe 10 and the feed rate of gas C may be properly determined so as to cause foam phase D to spout vigorously from foam inlet pipe 10 and strike against foam breaker means (or foam breaker plate) 11. In this case, the distance between foam inlet pipe 10 and foam breaker means (or foam breaker plate) 11 is properly determined with consideration for the type of the desulfurization absorbing fluid, the diameter of gas bubbles, the rate of movement of gas bubbles, and the like. The foam breaker plate may be made movable so that it can be adjusted to the optimum position.

A plurality of foam inlet pipe 10 may be installed between treating tank 1 and foam breaking tank 16.

The present inventor has found that, if the foam phase is allowed to grow to its free height and the upper part of the foam phase is separated and treated, the liquid produced as a result of spontaneous foam breaking, which is heavier than the foam, descends through the foam phase and flows into stored fluid B. During this process, the broken foam liquid causes fine particles of unburned carbon and other materials in the foam phase to move downward.

Accordingly, it is desirable to break the foam phase by a suitable foam breaker means before spontaneous foam breaking occurs. Thus, fine particles entrained by gas bubbles in the foam phase which ascends substantially in the form of a piston flow can be recovered without allowing most of them to move downward through the foam phase.

Figure 2:
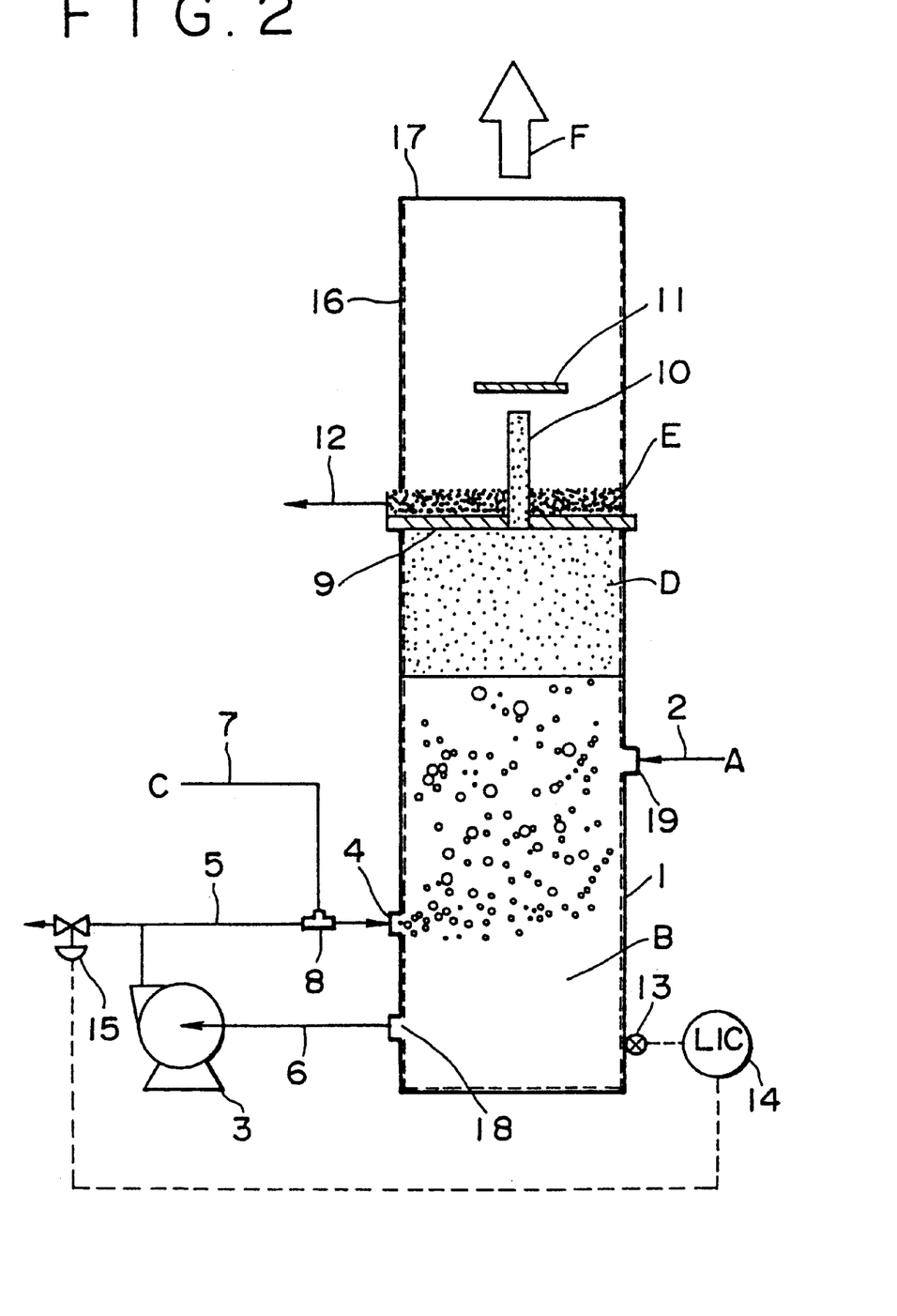
FIG. 2 is a schematic view illustrating an apparatus for the treatment of a desulfurization absorbing fluid in accordance with another embodiment of the present invention.

In the apparatus for the treatment of a wet desulfurization absorbing fluid in accordance with the present invention, the absorbing fluid withdrawn from absorbing fluid outlet port 18 and flowing through withdrawal pipe 6 may be pressurized with a circulating pump 3 to return a portion of the absorbing fluid to treating tank 1 through a return pipe 5, as illustrated in FIG. 2. Moreover, in the course of return, a gas may be fed into the absorbing fluid by means of a mixer 8. In this case, the absorbing fluid containing gas bubbles is introduced into treating tank 1 through gas feed port 4. In mixer 8, the returned absorbing fluid is mixed with a gas C fed through a gas pipe 7. The other parts of the apparatus illustrated in FIG. 2 are the same as those of the apparatus illustrated in FIG. 1, including the reference numerals.

In this embodiment, mixer 8 may have any desired structure that makes it possible to mix gas C with the circulating fluid and form an adequate number of gas bubbles having a suitable diameter. Specific examples thereof include a mere combination of pipes, a dispersing plate attached to the end of gas pipe 7, and a mixer having therein a spiral ribbon or agitating blades. Any suitable type of mixer may be used with consideration for the type of the desulfurization absorbing fluid, the concentration and temperature of the slurry, the particle diameter of the solid matter, the possibility of clogging, and the like.

Figure 3:
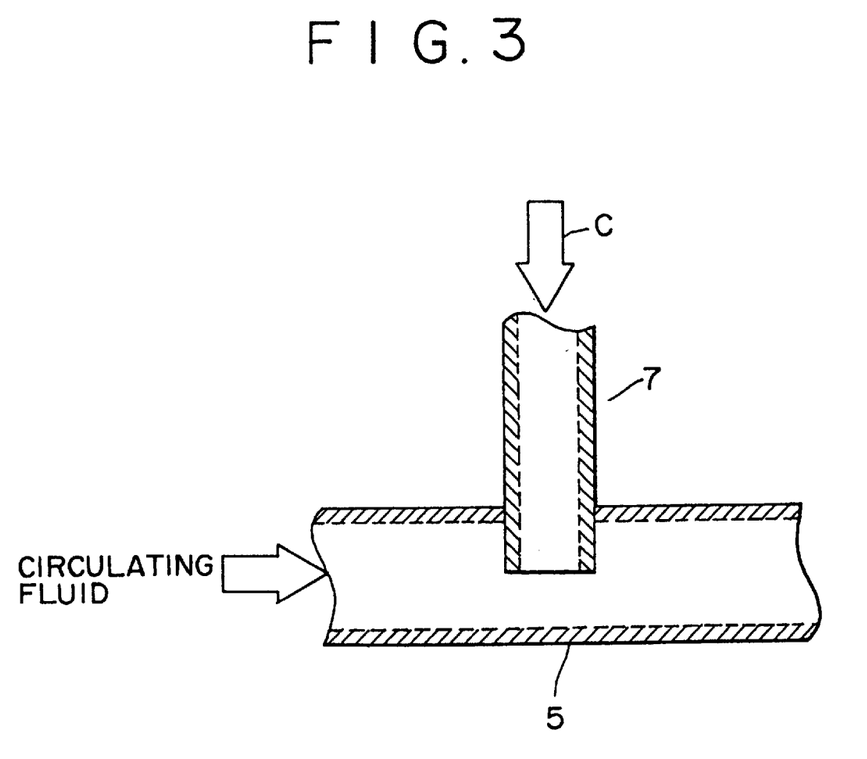
FIG. 3 is a sectional view illustrating an example of the mixer used in the apparatus for the treatment of a desulfurization absorbing fluid in accordance with the present invention.

An example of mixer 8 is illustrated in FIG. 3. In FIG. 3, gas pipe 7 for feeding gas C therethrough projects into return pipe 5 through which the absorbing fluid flows, in such a way that the end thereof comes near to the center of a cross section of return pipe 5. In mixer 8, gas C fed thereto is divided into very fine bubbles by the action of the circulating fluid (or absorbing fluid) driven by circulating pump 3 and dispersed into stored fluid B within treating tank 1. When return pipe 5 projects into treating tank 1 in such a way that the end of return pipe 5 comes near to the center of treating tank 1, gas bubbles can be supplied into treating tank 1 uniformly.

Figure 4:
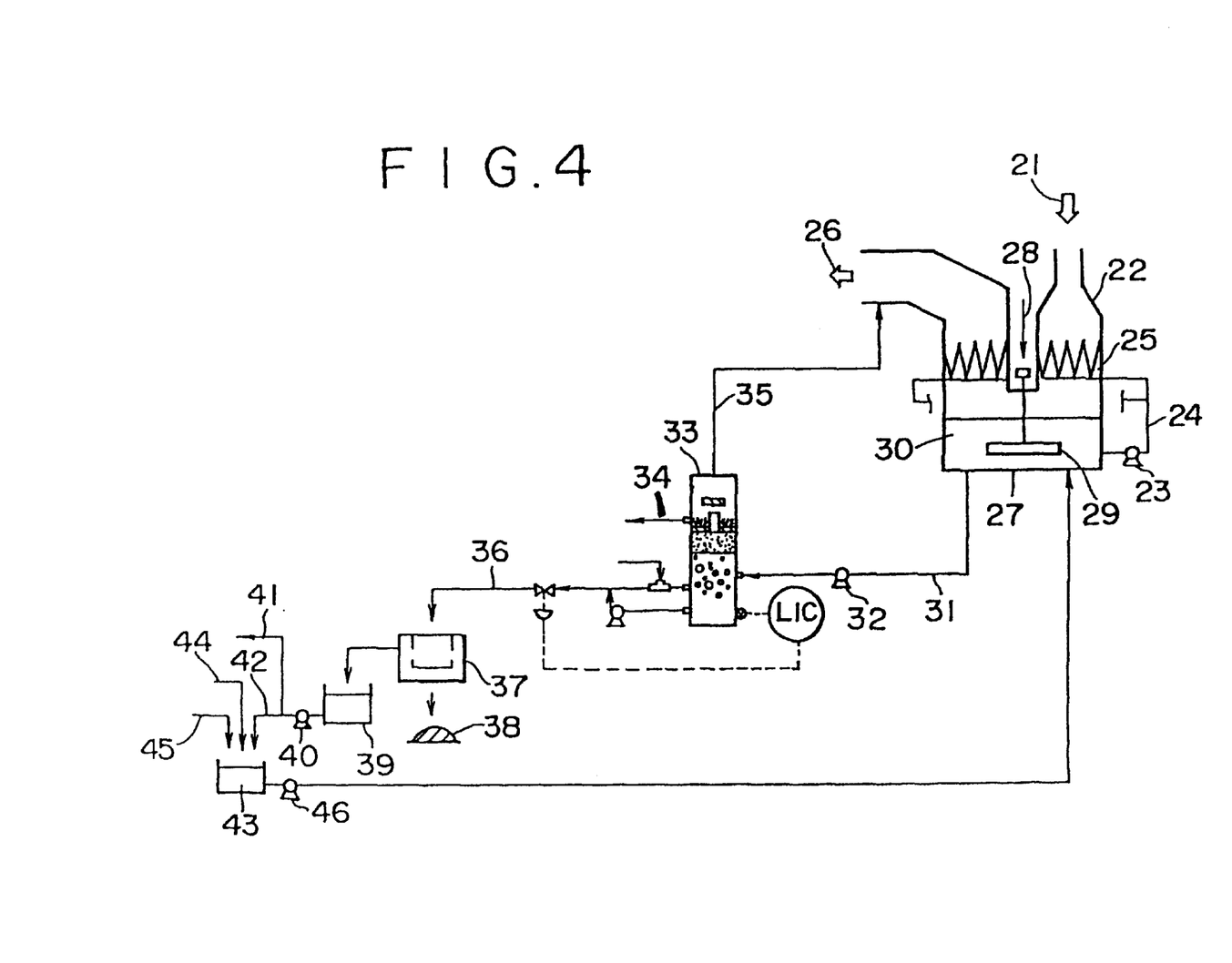
FIG. 4 is a flow diagram illustrating an example of a flue gas desulfurization plant including an apparatus for the treatment of a desulfurization absorbing fluid in accordance with the present invention.

FIG. 4 illustrates a wet flue gas desulfurization plant using a lime slurry.

Combustion exhaust gas 21 from a fuel oil-fired boiler is introduced into a wet flue gas desulfurizer 22 where the exhaust gas is brought into contact with a lime slurry conveyed through a pipe 24 by means of a circulating pump 23 and injected from a nozzle 25, so that sulfur oxides ($SO_x$) are absorbed into the lime slurry and thereby removed from the exhaust gas. The exhaust gas so treated is then discharged as purified gas 26.

The tank 27 of an absorption tower is equipped with a rotating-arm air sparger 29 for blowing the supplied air 28 efficiently into desulfurization absorbing fluid 30 in the form of fine air bubbles. Desulfurization absorbing fluid 30 having $SO_x$ absorbed thereinto comes into efficient contact with air 28 and thereby is oxidized with air to form gypsum. This gypsum precipitates from desulfurization absorbing fluid 30, which eventually forms a slurry having a gypsum concentration of 10 to 30% by weight.

The desulfurization absorbing fluid is withdrawn from tank 27 through a pipe 31, passed through a pump 32, and fed into an apparatus 33 for the treatment of the desulfurization absorbing fluid. The broken foam fluid produced in the foam breaking tank of treating apparatus 33 is discharged through an overflow pipe 34, while the off-gas is conducted through a pipe 35 and discharged out of the system together with purified gas 26 from wet flue gas desulfurizer 22.

The desulfurization absorbing fluid withdrawn from treating apparatus 33, except the portion returned to treating apparatus 33, is conducted to a solid-liquid separator 37 through a pipe 36 and separated into gypsum 38 and filtrate 39. The separated gypsum 38 Is effectively utilized for the manufacture of gypsum plaster boards.

On the other hand, filtrate 39 is passed through a pump 40 and a portion thereof is conveyed to a waste water treatment system (not shown) through a line 41. The remainder is conducted through a line 42 and supplied to a slurry 43 containing limestone as an absorbent for $SO_2$. Separately, industrial water 44 and limestone 45 are supplied to slurry 43. This slurry 43 is conveyed through a line 47 by means of a pump 46 and fed into wet flue gas desulfurizer 22.

Figure 5:
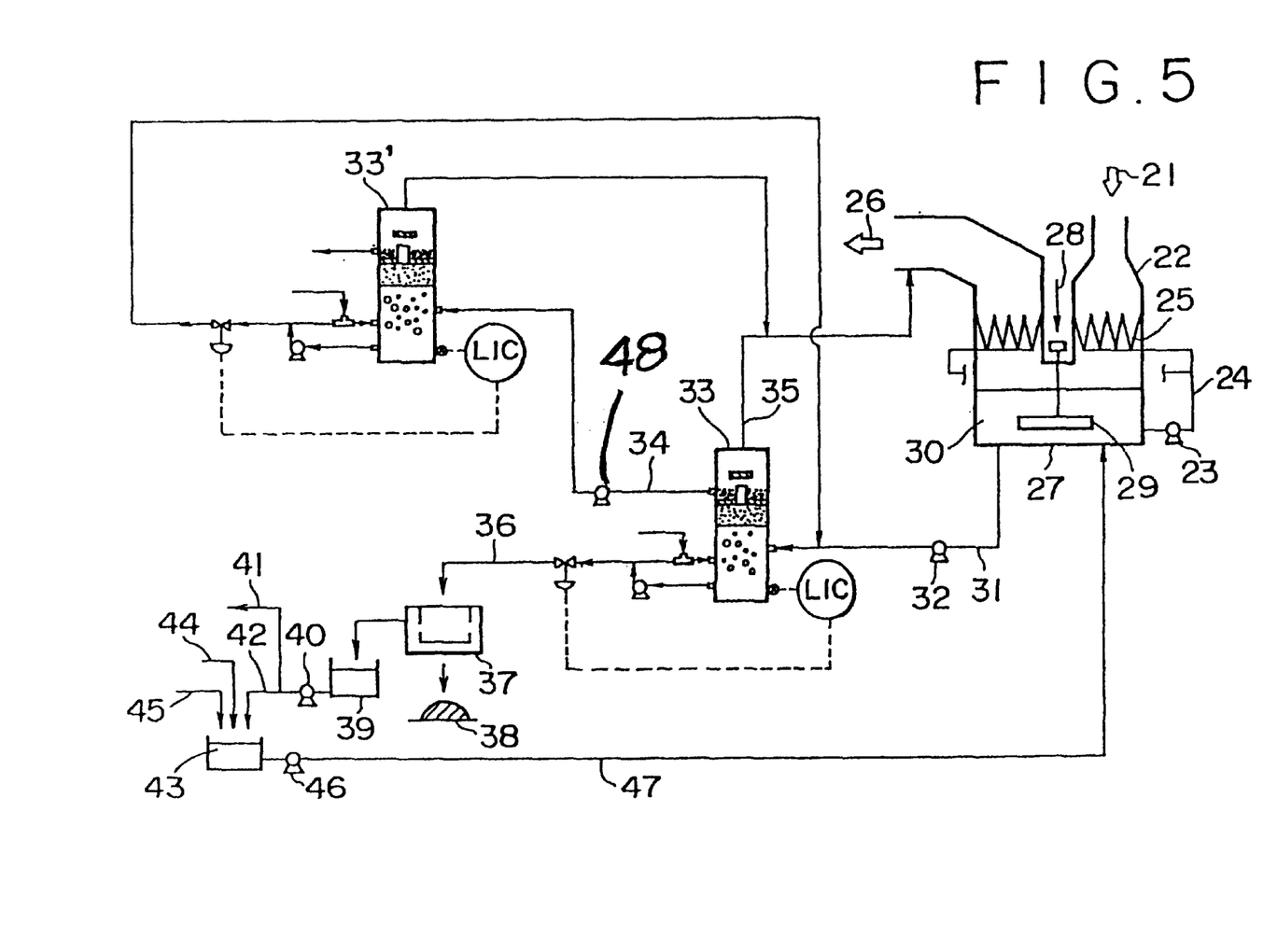
FIG. 5 is a flow diagram illustrating another example of a flue gas desulfurization plant including a plurality of apparatus for the treatment of a desulfurization absorbing fluid in accordance with the present invention.

The broken foam liquid discharged from treating apparatus 33 through overflow pipe 34 contains about 30 to 50% by weight of gypsum in addition to fine particles of unburned carbon and other materials. In order to recover gypsum present in this broken foam liquid and, moreover, enhance the degree of concentration of fine particles of unburned carbon and other materials and thereby carry out the separation treatment of these fine particles efficiently and economically, a plurality of treating apparatus may be installed as illustrated in FIG. 5. In FIG. 5, the broken foam liquid containing gypsum and fine particles of unburned carbon and other materials is conveyed through overflow pipe 34 by means of a pump 48 and fed again into a treating apparatus 33' similar to treating apparatus 33. Thus, the gypsum present therein is separated and recovered.

Figure 6:
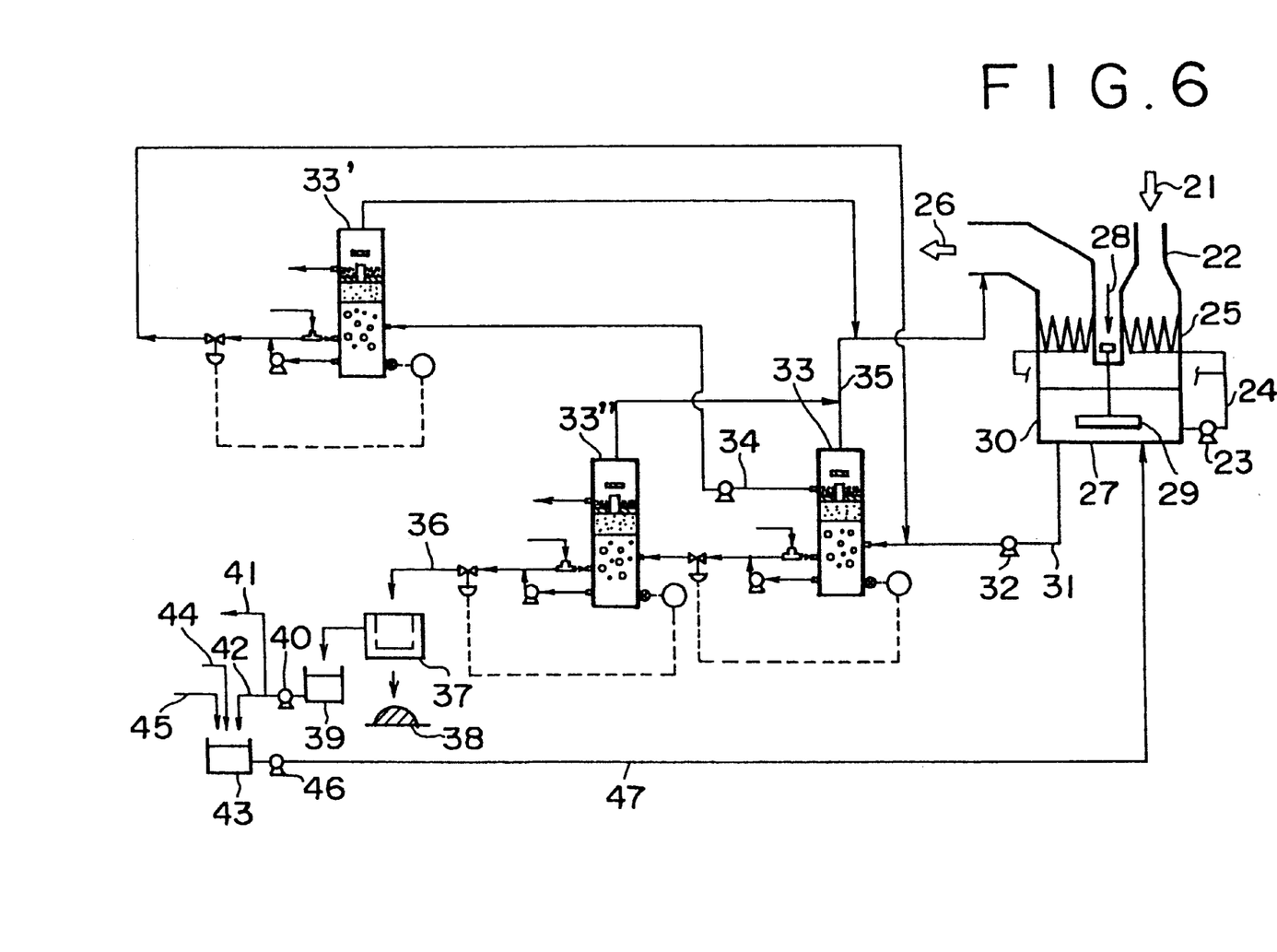
FIG. 6 is a flow diagram illustrating still another example of a flue gas desulfurization plant including a plurality of apparatus for the treatment of a desulfurization absorbing fluid in accordance with the present invention.

In the plant illustrated in FIG. 4, a treating apparatus similar to treating apparatus 33 for the desulfurization absorbing fluid may be installed at an intermediate position of pipe 36 to further improve the degree of removal of fine particles of unburned carbon and other materials. For example, A plant illustrated in FIG. 6 is the same as the plant illustrated in FIG. 5, except that a treating apparatus 33" for the desulfurization absorbing fluid is added at an intermediate position of pipe 36.

The present invention is more specifically explained with reference to the following examples. However, these examples are not to be construed to limit the scope of the invention.

EXAMPLE 1

An experiment was carried out by using a treating apparatus illustrated in FIG. 2.

A foam breaking tank 16 having a height of 1 m was installed above a treating tank 1 having a diameter of 30 cm and a height of 2 m, and a separator 9 was interposed between treating tank 1 and foam breaking tank 16. A foam inlet pipe 10 having an inner diameter of 2.5 cm and a length of 30 cm was attached to separator 9, and a foam breaker means (or foam breaker plate) 11 having a diameter of 10 cm was disposed 2.5 cm above the upper end of foam inlet pipe 10. A feed pipe 2 having a bore diameter of 1.5 cm was attached to treating tank 1 at apposition 1 m above the bottom thereof. A withdrawal pipe 6 having a bore diameter of 2.5 cm was attached to treating tank 1 at a position 20 cm above the bottom thereof. A circulating pump 3 was connected to withdrawal pipe 6, and a return pipe 5 having a bore diameter of 2.5 cm was installed on the downstream side of circulating pump 3. A mixer 8 was formed by inserting a gas pipe 7 having a bore diameter of 1.5 cm through the sidewall of return pipe 5 so that its end came near to the center of return pipe 5.

Using the apparatus constructed according to the above-described specifications, an experiment was carried out under the following conditions.

(1) Desulfurization absorbing fluid A: An absorbing fluid collected at the outlet of a wet desulfurization tower (i.e., a slurry having an unburned carbon content of about 400 mg per liter, a soluble salt (e.g., ammonium sulfate) content of about 30 g per liter, and a gypsum concentration of about 20% by weight).
(2) Feed rate of desulfurization absorbing fluid A: 1 m$^3$/h.
(3) Volume of stored fluid B: 0.105 m$^3$ (with a depth of 1.5 m).
(4) Suction rate of circulating pump 3: 8–10 m$^3$/h.
(5) Flow rate of gas C (air): 10–14 m$^3$/h.

While a regulating valve 15 was being operated according to the preset value of a controller 14 so that the depth of the absorbing fluid within treating tank 1 might be kept constant, the absorbing fluid was withdrawn from absorbing fluid outlet port 18.

The space between the surface of stored fluid B and separator 9 was filled with a foam phase D, and a stream of foam spouting from foam inlet pipe 10 struck vigorously against foam breaker plate 11. The resulting broken foam liquid E accumulated in the bottom of foam breaking tank 16 to a depth of about 5 cm and overflowed through an overflow pipe 12 at a flow rate of about 0.3 m$^3$/h. This broken foam liquid E contained unburned carbon in an amount of about 12,000–14,000 mg per liter.

As a result, the unburned carbon content of the absorbing fluid withdrawn through withdrawal pipe 6 was reduced to about 1–5 mg per liter.

Using a solid-liquid separator (or centrifugal separator), gypsum was recovered from the absorbing fluid withdrawn through withdrawal pipe 6. The gypsum thus obtained contained 0.23 mg of ammonium sulfate and 0.01 mg of unburned carbon per gram of the gypsum, and had high whiteness.

EXAMPLE 2

An experiment was carried out by using a plant illustrated in FIG. 5. The first-stage treating apparatus 33 included in the plant of FIG. 5 was the same treating apparatus as used in the foregoing Example 1.

The broken foam liquid discharged from first-stage treating apparatus 33 through overflow pipe 34 was fed to a second-stage treating apparatus 33'. The size of this second-stage treating apparatus 33' was smaller than that of first-stage treating apparatus 33. That is, in second-stage treating apparatus 33', the treating tank had a diameter of 15 cm and a height of 2 m, a foam breaking tank having a height of 1 m was installed above the treating tank 1, and a separator was interposed between the treating tank and the foam breaking tank. A foam inlet pipe having an inner diameter of 1.5 cm and a length of 30 cm was attached to the separator, and a foam breaker plate having a diameter of 5 cm was disposed 2.5 cm above the upper end of the foam inlet pipe. In other respects, the construction of the second-stage treating apparatus was the same as that of the first-stage treating apparatus.

Using the apparatus constructed according to the above-described specifications, an experiment was carried out under the following conditions.
(1) Desulfurization absorbing fluid: An absorbing fluid collected at the outlet of a wet desulfurization tower
  (a) Unburned carbon content: 1,350 mg/L.
  (b) Gypsum concentration: 20% by weight (slurry).
  (c) Content of soluble salt (e.g., ammonium sulfate): 0.5 mole/L as expressed in terms of ionic strength.
    (Note) Ionic strength is defined by the following equation:

$$I = (½) \times (\Sigma C_i Z_i^2)$$

where I is the ionic strength (in moles/L), Ci is the concentration of an ion i (in moles/L), and Zi is the valence number of an ion i.
(2) First-stage treating apparatus
  (a) Feed rate of desulfurization absorbing fluid: 1 m$^3$/h.
  (b) Volume of stored fluid: 0.105 m$^3$ (with a depth of 1.5 m).
  (c) Suction rate of circulating pump: 10 m$^3$/h.
  (d) Flow rate of gas (air): 12 m$^3$N/h (170 m$^3$N/h m$^2$).
  (e) Flow rate of absorbing fluid fed to solid-liquid separator: 0.9 m$^3$/h.
  (f) Overflow rate from foam breaking tank: 0.1 m$^3$/h.
(3) Second-stage treating apparatus
  (a) Feed rate of desulfurization absorbing fluid: 0.1 m$^3$/h.
  (b) Volume of stored fluid: 0.026 m$^3$ (with a depth of 1.5 m).
  (c) Suction rate of circulating pump: 0.5 m$^3$/h.
  (d) Flow rate of gas (air): 3 m$^3$N/h (170 m$^3$N/h·m$^2$).
  (e) Flow rate of absorbing fluid fed to solid-liquid separator: 0.09 m$^3$/h.
  (f) Overflow rate from foam breaking tank: 0.01 m$^3$/h.

This experiment revealed that, while the unburned carbon concentration in the desulfurization absorbing fluid fed to the first-stage treating apparatus was 1,350 mg/L, the unburned carbon concentration in the desulfurization absorbing fluid fed to the solid-liquid separator was reduced to 13.5 mg/L. Thus, it was confirmed that unburned carbon was efficiently removed. The broken foam liquid discharged from the foam breaking tank contained 13.4 g/L of unburned carbon and 21.2 g/L of gypsum.

When this broken foam liquid was introduced into the second-stage treating apparatus and treated therein, the broken foam liquid discharged from the foam breaking tank of the second-stage treating apparatus contained 132.8 g/L of unburned carbon and 2.2 g/L of gypsum. As compared with the broken foam liquid discharged from the first-stage treating apparatus, the broken foam liquid discharged from the second-stage treating apparatus had a lower gypsum content and a higher unburned carbon content. Moreover, since the volume of the broken foam liquid was decreased, more economical waste disposal could be achieved.

Using a solid-liquid separator (or centrifugal separator), gypsum was recovered from the desulfurization absorbing fluid withdrawn from the first-stage treating apparatus. This gypsum had an unburned carbon concentration of 0.02 mg/g, and exhibited high whiteness.

EXAMPLE 3

An experiment was carried out by using a plant illustrated in FIG. 4. A desulfurization absorbing fluid containing fine particles of unburned carbon and other materials was treated by using only a treating apparatus similar to the first-stage treating apparatus used in Example 2.

(1) Desulfurization absorbing fluid: An absorbing fluid collected at the outlet of a wet desulfurization tower
   (a) Unburned carbon content: 2.1 g/L.
   (b) Gypsum concentration: 21% by weight (slurry).
   (c) Content of soluble salt (e.g., ammonium sulfate): 0.1–1.5 moles/L as expressed in terms of ionic strength (varied condition).
   (Note) Ionic strength is defined by the following equation:

$$I=(\tfrac{1}{2}) \times (\Sigma C_i Z_i^2)$$

where I is the ionic strength (in moles/L), $C_i$ is the concentration of an ion i (in moles/L), and $Z_i$ is the valence number of an ion i.

(2) Feed rate of desulfurization absorbing fluid: 1 m³/h.
(3) Volume of stored fluid within treating tank: 0.105 m³ (with a depth of 1.5 m).
(4) Suction rate of circulating pump: 10 m³/h.
(5) Flow rate of gas (air): 1.5–25 m³N/h (varied condition).

While a regulating valve was being operated according to the preset value of a controller so that the depth of the desulfurization absorbing fluid within treating tank of treating apparatus 33 might be kept constant, the treated fluid was withdrawn through a withdrawal pipe.

The degree of removal of unburned carbon in the desulfurization absorbing fluid withdrawn from the treating tank of treating apparatus 33 and delivered to a solid-liquid separator was examined by varying the ionic strength of the desulfurization absorbing fluid and using the flow rate of the gas (air) blown into the treating tank as a parameter.

Figure 7:
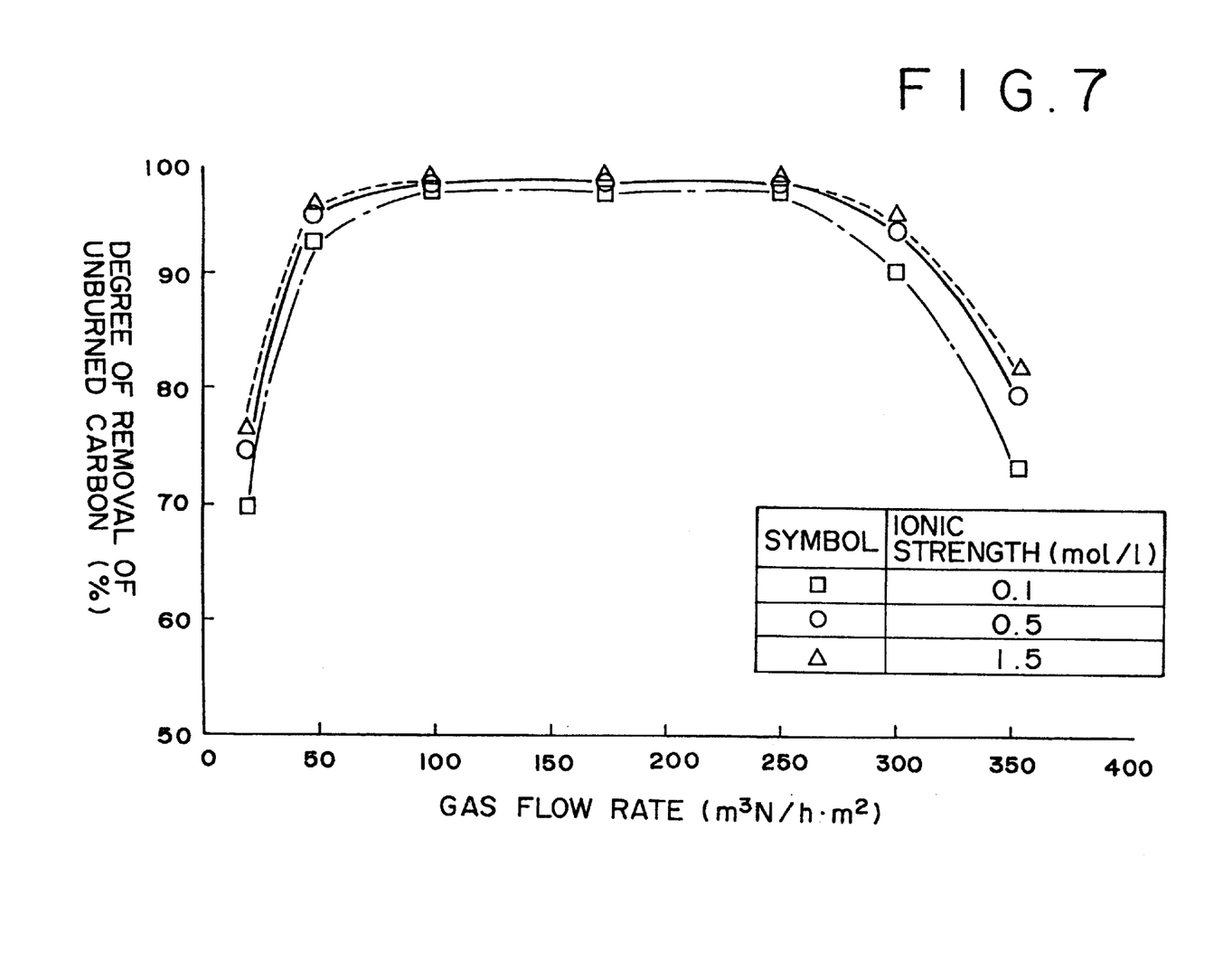
FIG. 7 is a graph showing the relationship between the flow rate of the gas fed into the treating tank and the degree of removal of unburned carbon.

As a result, it was found that the degree of removal of unburned carbon varied considerably according to the flow rate (in m³N/h·m²) of the gas blown into treating apparatus 33 (i.e., the gas flow rate per unit cross-sectional area of the treating tank), as shown in FIG. 7. This indicates that there is an optimum range of operating conditions.

Specifically, in order to remove unburned carbon efficiently, it is advantageous to operate the treating apparatus at a gas flow rate in the range of 50 to 300 m³N/h·m² and preferably 100 to 250 m³N/h·m². If the gas flow rate is less than 50 m³N/h·m², the desulfurization absorbing fluid will exhibit poor foamability. If the gas flow rate is greater than 300 m³N/h·m², a higher proportion of the foam will be broken before passing through the foam inlet pipe, resulting in a low degree of removal of fine particles of unburned carbon and other materials.

Tests were carried out on desulfurization absorbing fluids having an ionic strength in the range of 0.1 to 1.5 moles/L. If the ionic strength is not less than 0.1 mole/L, the desulfurization absorbing fluid will exhibit good foamability. Accordingly, the desulfurization absorbing fluid obtained from a wet flue gas desulfurizer for removing $SO_2$ from the combustion exhaust gas of an ordinary oil-fired boiler or the like can be directly used. If the ionic strength of the desulfurization absorbing fluid is insufficient, its ionic strength can be increased by the addition of a soluble salt such as ammonium sulfate.

As a result, the unburned carbon concentration in the desulfurization absorbing fluid withdrawn from the treating tank of treating apparatus 33 was reduced to 10–20 mg/L. Using a solid-liquid separator (or centrifugal separator) 37, gypsum 38 was recovered from this absorbing fluid by solid-liquid separation. Thus, there was obtained gypsum having high whiteness.

EXAMPLE 4

Figure 8:
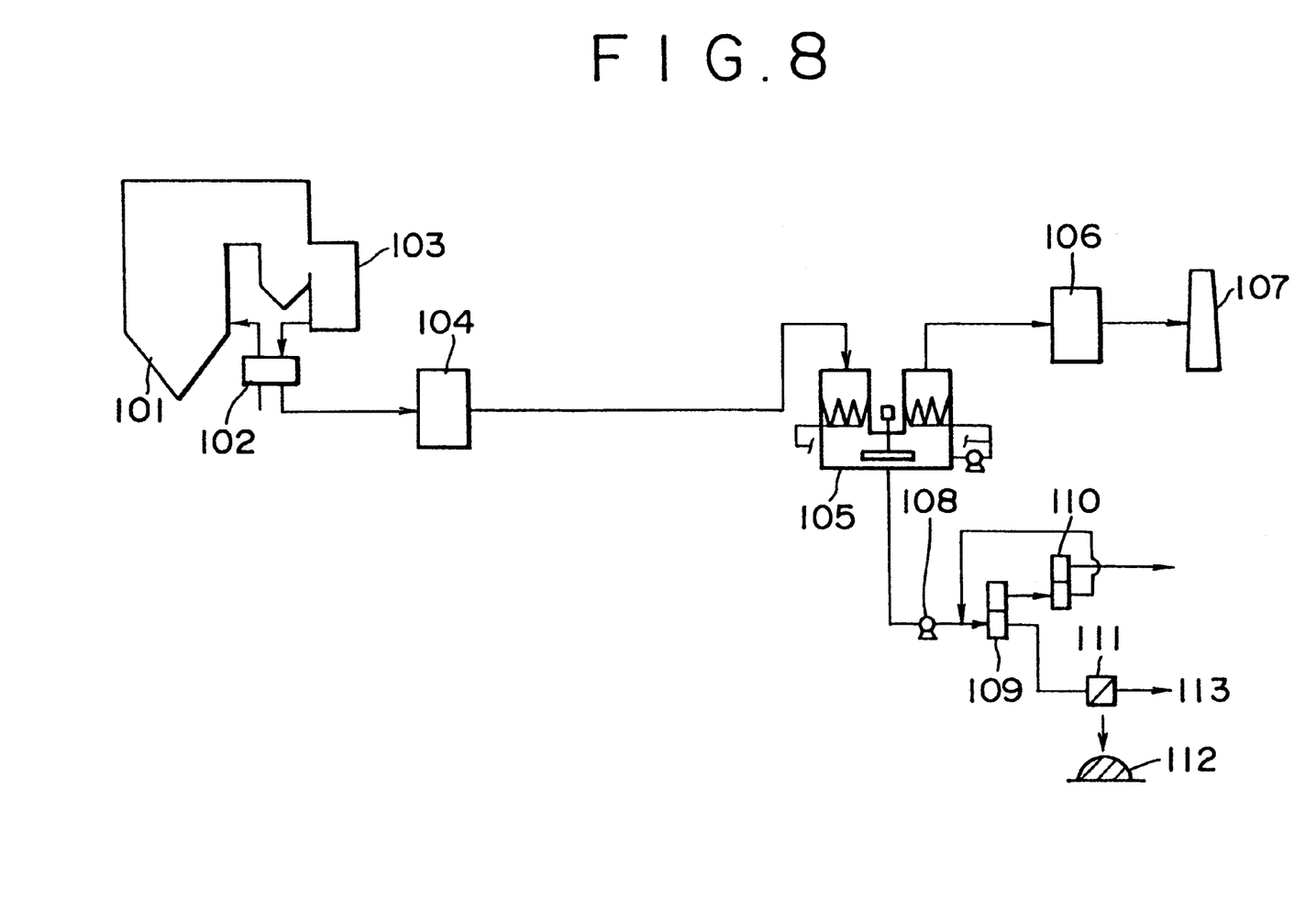
FIG. 8 is a flow diagram illustrating a further example of a flue gas desulfurization plant including a plurality of apparatus for the treatment of a desulfurization absorbing fluid in accordance with the present invention.

FIG. 8 illustrates an example of a flue gas desulfurization plant in which treating apparatus in accordance with the present invention are installed. In FIG. 8, exhaust gas discharged from an oil-fired boiler 101 is introduced into a denitrator 103 where $NO_x$ is removed from the exhaust gas by catalytic reduction with ammonia gas (not shown) injected thereinto. The exhaust gas leaving denitrator 103 is passed through an air preheater 102 where it undergoes heat exchange with air blown into boiler 101, and heat is then recovered therefrom in a heat recovery unit 104 installed downstream. Thereafter, the exhaust gas cooled in heat recovery unit 104 is introduced into a wet desulfurizer 105 where sulfur oxides and dust (i.e., unburned carbon and other materials) are removed therefrom. Then, the exhaust gas is heated in a reheater 106 and discharged from a stack 107. On the other hand, the desulfurization absorbing fluid containing fine particles of unburned carbon and other materials is withdrawn from wet desulfurizer 105 by means of a pump 108 and introduced into a first-stage treating apparatus 109 for the desulfurization absorbing fluid. The liquid discharged from the foam breaking tank of treating apparatus 109 is further treated in a second-stage treating apparatus 110. The desulfurization absorbing fluid from which unburned carbon has been removed is introduced into a solid-liquid separator 111 where it is separated into gypsum 112 and filtrate 113.

Flue gas desulfurization was carried out by using the plant illustrated in FIG. 8. The testing conditions were as follows.

(1) Flow rate of exhaust gas from oil-fired boiler: 200 m³N/h.
(2) $SO_x$ concentration In exhaust gas: 1,500 ppm.
(3) $NO_x$ concentration in exhaust gas: 110 ppm.
(4) Content of unburned carbon in exhaust gas: 205 mg/m³N.
(5) Degree of denitration in denitrator: 90%.
(6) Degree of desulfurization in wet desulfurizer: 97%.
(7) Degree of dust removal in wet desulfurizer: 95%.

In order to test the treating apparatus of the present invention, a portion of the absorbing fluid was withdrawn from the wet desulfurizer. The withdrawn fluid had an unburned carbon content of 3,400 mg/L and a soluble salt content of 0.8 mole/L as expressed in terms of ionic strength. The treating apparatus used in this example were similar to that used in Example 1. As a result of the experiment, the unburned carbon concentration in the desulfurization absorbing fluid fed into the first-stage treating apparatus was 3,400 mg/L, but the unburned carbon concentration in the desulfurization absorbing fluid withdrawn from the treating tank was 32 mg/L. Moreover, the gypsum recovered by means of a solid-liquid separator was analyzed. This gypsum contained 0.16 mg of unburned carbon per gram of the gypsum, and had high whiteness.

The broken foam liquid overflowing from the foam breaking tank of the second-stage treating apparatus had an unburned carbon concentration of 320 g/L and a gypsum concentration of 5.5 g/L. It is to be understood that the present invention is not limited to use in the system illustrated in FIG. 8, but may be used, for example, in systems from which one or more of the denitrator, heat recovery unit and reheater are omitted.

Figure 9:
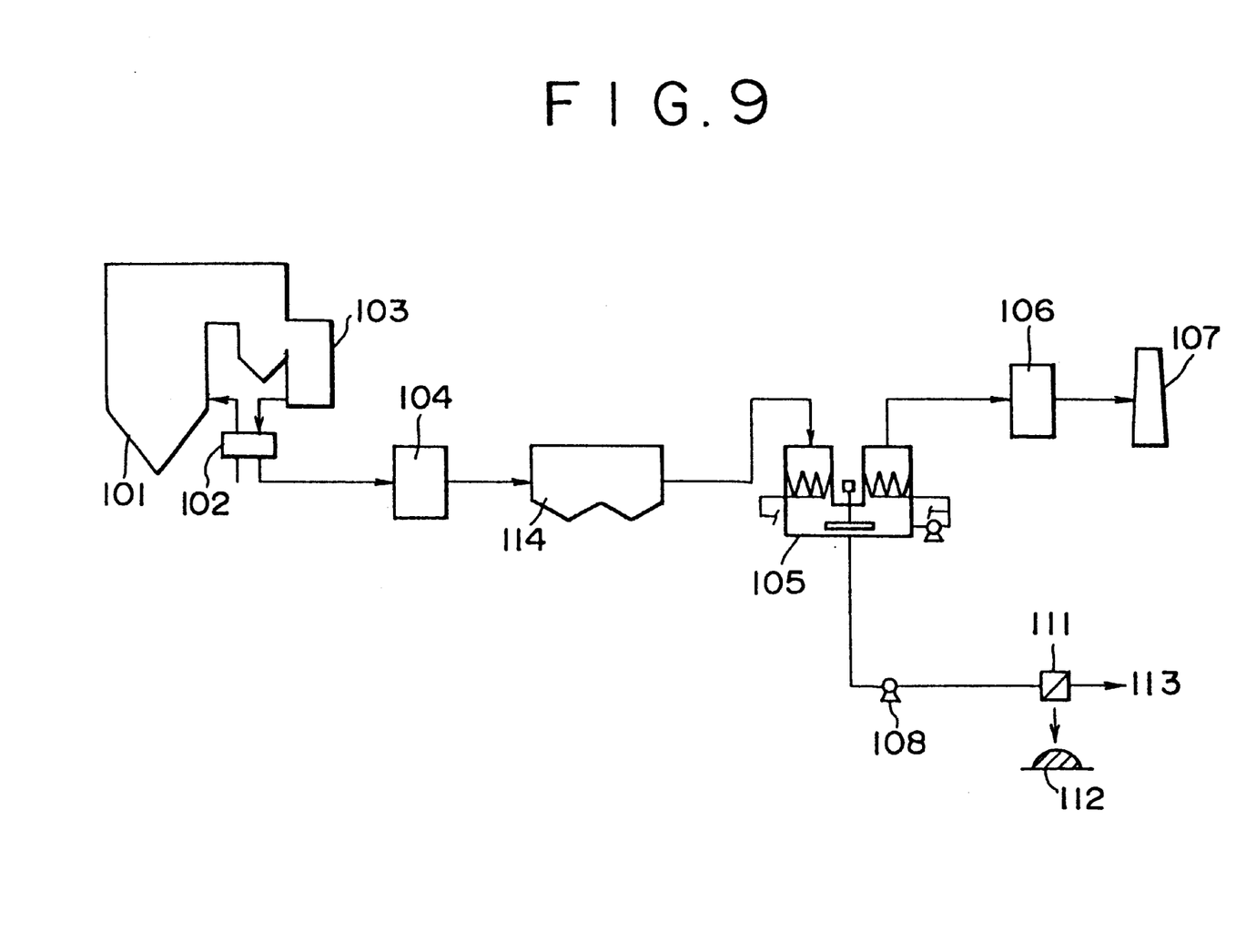
FIG. 9 is a flow diagram illustrating a conventional flue gas desulfurization plant.

FIG. 9 illustrates a conventional flue gas desulfurization plant.

Unburned carbon-containing exhaust gas discharged from an oil-fired boiler 101 is introduced into a denitrator 103 where $NO_x$ is removed from the exhaust gas by catalytic reduction with ammonia gas (not shown) injected thereinto. The exhaust gas leaving denitrator 103 is passed through an air preheater 102 where it undergoes heat exchange with air blown into boiler 101, and heat is then recovered therefrom in a heat recovery unit 104 installed downstream. Thereafter, the exhaust gas is introduced into an electrostatic precipitator 114.

The exhaust gas introduced into electrostatic precipitator 114 usually contains several hundred $mg/m^3N$ of unburned carbon, and more than 90% of the unburned carbon is removed in electrostatic precipitator 114. As a result of the removal of unburned carbon in electrostatic precipitator 114, the dust concentration in the exhaust gas discharged from a stack 107 can be reduced to a sufficiently low level. Moreover, the content of unburned carbon in gypsum formed as a byproduct in a wet desulfurizer 105 is decreased, so that highly pure gypsum having high whiteness can be obtained. The exhaust gas from which most of the unburned carbon has been removed is introduced into wet desulfurizer 105 where $SO_x$ present in the exhaust gas is removed by absorption into a lime slurry used as the absorbing fluid and, at the same time, gypsum is formed as a by-product. The slurry containing gypsum is withdrawn from desulfurizer 105 by means of a pump 108, and introduced into a solid-liquid separator 111 where gypsum 112 is recovered by solid-liquid separation. The resulting filtrate 113 is used as make-up water for dissolving limestone.

In conventional wet desulfurizers, unburned carbon present in a gas is removed by the collision of the gas with a liquid. Especially in a desulfurizers of the liquid column type, its dedusting effect is more excellent and, therefore, the dust concentration in the gas discharged from a stack can be reduced to a sufficiently low level even if the electrostatic precipitator is omitted. However, if the treating apparatus of the present invention is not employed, the content of unburned carbon in the absorbing fluid of the wet desulfurizer is as high as several thousand milligrams per liter, so that the recovered gypsum will have low whiteness and low purity. In contrast, if the treating apparatus of the present invention is employed, not only the electrostatic precipitator can be omitted, but also highly pure gypsum can be recovered.

What is claimed is:

1. An apparatus for the treatment of a desulfurization absorbing fluid after gas-liquid contact with combustion exhaust gas containing fine particles of unburned carbon and other materials, which comprises a treating tank for storing the absorbing fluid containing the fine particles, the treating tank having an absorbing fluid feed port for feeding the absorbing fluid into the treating tank, and a gas feed port for feeding a gas into the absorbing fluid stored in the treating tank and thereby producing gas bubbles to create a foam phase consisting of the gas bubbles in the treating tank; a foam breaking tank adjoining the treating tank; a foam inlet pipe for connecting the treating tank with the foam breaking tank in fluid communication relationship; and foam breaker means disposed in the foam breaking tank for breaking the foam phase having passed through the foam inlet pipe to obtain a liquid containing the fine particles.

2. An apparatus for the treatment of a desulfurization absorbing fluid as claimed in claim 1 wherein a plurality of said apparatus for the treatment of a desulfurization absorbing fluid are installed in successive stages, and said apparatus are connected by feeding means for delivering the fine particle-containing liquid obtained in the apparatus at the preceding stage to the absorbing fluid feed port of the apparatus at the succeeding stage.

3. An apparatus for the treatment of a desulfurization absorbing fluid as claimed in claim 1 wherein the treating tank has an outlet port for withdrawing the absorbing fluid stored in the treating tank, and said apparatus is equipped with means for returning a portion of the absorbing fluid withdrawn from the outlet port, together with the gas, to the treating tank through the gas feed port.

4. An apparatus for the treatment of a desulfurization absorbing fluid as claimed in claim 1 wherein a plurality of said apparatus for the treatment of a desulfurization absorbing fluid are installed in successive stages, and said apparatus are connected by feeding means for delivering the absorbing fluid withdrawn from the outlet port of the treating tank of the apparatus at the preceding stage, except the portion returned to the treating tank, to the absorbing fluid feed port of the apparatus at the succeeding stage.

* * * * *